United States Patent [19]
Ganser

[11] Patent Number: 6,044,725
[45] Date of Patent: Apr. 4, 2000

[54] EVERSIBLE TUBE FOR MOTOR VEHICLES

[75] Inventor: Martin Ganser, Weil der Stadt, Germany

[73] Assignee: DaimlerChrysler AG, Germany

[21] Appl. No.: 08/904,550

[22] Filed: Aug. 4, 1997

[30] Foreign Application Priority Data

Aug. 2, 1996 [DE] Germany ............... 196 31 215

[51] Int. Cl.⁷ .................................................. B62D 1/16
[52] U.S. Cl. ............................................. 74/492; 280/777
[58] Field of Search ............... 74/492, 493; 280/777; 188/377; 293/132, 133

[56] References Cited

U.S. PATENT DOCUMENTS

| | | | |
|---|---|---|---|
| 3,511,345 | 5/1970 | Takamatsu et al. | 74/492 X |
| 3,597,993 | 8/1971 | Ripley . | |
| 3,599,757 | 8/1971 | Takamatsu et al. | 74/492 X |
| 3,998,485 | 12/1976 | Putter et al. | 188/377 X |
| 4,589,679 | 5/1986 | Wackerle et al. | 280/777 |
| 5,081,879 | 1/1992 | Pidgeon | 74/492 |
| 5,224,574 | 7/1993 | Thum | 188/377 X |
| 5,590,565 | 1/1997 | Palfenier et al. | 74/493 |
| 5,634,662 | 6/1997 | Asayama | 280/777 |
| 5,669,634 | 9/1997 | Heinzman et al. | 280/777 |

FOREIGN PATENT DOCUMENTS

| | | |
|---|---|---|
| 1 555 140 | 1/1969 | France . |
| 1 931 844 | 4/1970 | Germany . |
| 33 21 198 C1 | 11/1984 | Germany . |
| 195 11 867 C1 | 5/1996 | Germany . |

*Primary Examiner*—David A. Bucci
*Assistant Examiner*—Brandon C. Stallman
*Attorney, Agent, or Firm*—Evenson, McKeown, Edwards & Lenahan, P.L.L.C.

[57] ABSTRACT

An eversible tube is provided in a motor vehicle, especially as a connecting part for two steering shaft sections and which can be everted, starting at one end, during axial imposition of force with plastic deformation and energy consumption. Beginning at the eversion end, it has a longitudinal section that is easier to deform than the next longitudinal section.

16 Claims, 1 Drawing Sheet

EVERSIBLE TUBE FOR MOTOR VEHICLES

BACKGROUND AND SUMMARY OF THE INVENTION

This application claims the priority of German Application No. 196 31 215.9, filed in Germany on Aug. 2, 1996, the disclosure of which is expressly incorporated by reference herein.

The invention relates to an eversible tube for motor vehicles, and more particularly to an eversible tube used as a steering shaft, or as a connecting part between portions of a steering shaft.

German patent document DE 1 931 844 B1, relates to an eversible tube for motor vehicles, intended to absorb an axial impact as a result of the eversion process. Following the initiation of the eversion movement, a continuous plastic deformation is provided in this case that is achieved by a shape which has a constant wall thickness and which is cylindrical over its entire length.

In German patent document DE 33 21 198 C1, a safety steering shaft made of plastic is described, said shaft having sections with different outside diameters while the inside diameter remains constant, with a portion being provided for yielding deformation during axial loading.

This section is made with a larger outside diameter and a smaller wall thickness and can expand under pressure. It is not possible with this device to achieve a reduction of energy of the same order of magnitude as in a design that uses an eversible tube. The resistance to deformation decreases with increasing deformation accompanied by the breakup of the fiber structure of the plastic steering shaft.

A goal of the present invention is to suitably adapt the deformation resistance of an eversible tube in a steering shaft in order to better accept the force of an impact by a passenger.

This and other goals have been achieved according to the present invention by providing an eversible tube for a steering shaft of a motor vehicle, said tube being eversible to absorb energy of an axial force applied thereto by plastic deformation, said tube comprising at least two longitudinal sections which are plastically deformable by respectively different values of said axial force.

An eversible tube provided as a connecting part between two sections of a steering shaft of a motor vehicle, during axial loading of the steering wheel during a vehicle collision, can decrease the forces imposed by the passenger on the steering shaft due to its ability to deform and thus reduce the load imposed on the passenger by the resistance of the steering shaft. For this purpose, one end of the eversible rod is pushed through the cavity in the eversible tube or everted outward, with the wall of the eversible tube undergoing continuous deformation.

The eversible tube according to the invention reacts to the impact of the passenger appropriately, in that it has along its length areas with different degrees of resistance to deformation that determine the extent of deformability of the eversible tube.

The eversible tube is designed so that, beginning at the end where the eversion movement begins, it has a longitudinal section adjoined by a longitudinal section with at least one of (a) a narrower inside diameter or (b) a thicker wall, so that the eversible tube can be everted with less resistance in the first longitudinal section and with greater resistance in the second longitudinal section. The resistance to deformation of the eversible tube is selected and designed such that a lighter individual will be stopped by the flexibility of the steering shaft in the vicinity of the first, lower resistance, while a heavier individual will also reach the area with greater resistance and, following the more flexible phase, will be restrained with a greater resistance by the steering shaft in order to avoid complete eversion of the eversible tube and to prevent the steering shaft from striking the end stop.

A longitudinal section with easier deformability can in turn abut this longitudinal section with a greater resistance to deformation, so that the load imposed by the passenger decreases again, which then in the possible eversion phase will close off the section with the higher resistance to deformation.

An eversible tube with adjoining diameters of different sizes can be made with a wall thickness which is approximately constant over its length or which varies, so that the resistance to deformation of the eversible tube can additionally be influenced. Similarly, the eversible tube can be adapted simply on the basis of changing the wall thickness to be deformed over its length to suit the desired deformation conditions. The wall thickness can also be changed by separate parts that are attached to the eversible tube. The flexibility of the steering shaft during an axial application of force can thus be simply adapted to conditions in any motor vehicle.

A deformation force that remains approximately constant over a longitudinal section of the eversible tube, i.e., a resistance of the steering shaft to the passenger applies a force that is approximately at the same level, is achieved by each cylindrical shape of this section. The cylindrical sections that differ in diameter can be joined by conical sections that produce a smooth transition from low deformation resistance to high deformation resistance.

To support the steering shaft with the eversible tube, a three-point bearing with axially spaced bearing positions is advantageous, whose central bearing position locates the steering shaft near the eversible end of the eversible tube axially displaceably, so that the steering shaft does not kink during the deformation of the eversible tube. In order for the longitudinal displaceable portion of the steering shaft to be guided smoothly during its axial displacement movement, a sliding bearing location has a ball cage that is displaceable in it with the steering shaft. The bearing points can be combined integrally into a single mounting flange in order to be commonly supported in the motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
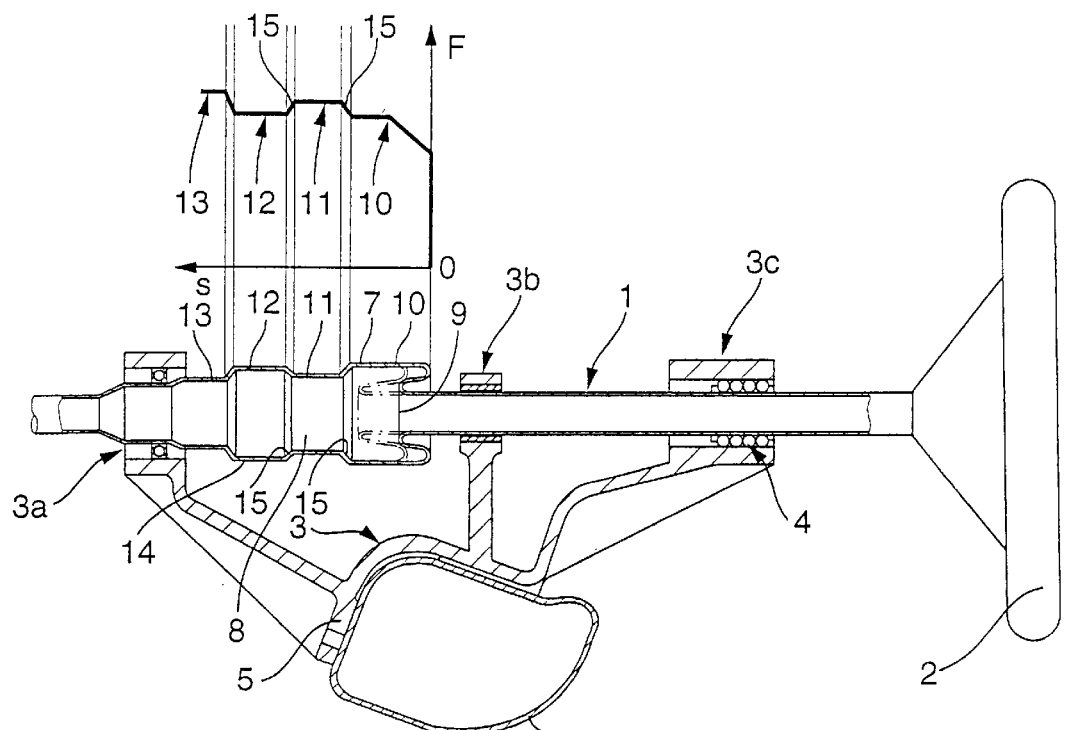
FIG. 1 is a side view of a portion of a steering shaft with an eversible tube according to a preferred embodiment of the present invention, with an initial deformed position indicated by the dot-dashed and with a force-travel graph showing the deformation force in the various sections of the eversible tube.

FIG. 1 shows a portion of a steering shaft 1 in a motor vehicle not shown in greater detail, which in an installed position in the vehicle, runs at an angle diagonally upward, coupling a steering gear with a steering wheel 2. Steering shaft 1 is supported in the motor vehicle by a three-point bearing 3 with axially spaced bearing points 3a, 3b, 3c, with bearing point 3a being a fixed bearing while bearing points 3b and 3c allow a sliding movement of steering shaft 1. For proper guidance of steering shaft 1 in the axial direction and support in the radial direction, bearing point 3c has a ball cage 4 located on steering shaft 1, the balls of said cage, during displacement of the steering shaft in the axial direction, rolling on the guide surface at bearing point 3c. Bearing points 3a, 3b, and 3c are integrally connected with a mounting flange 5 that brings bearing points 3a, 3b and 3c together in one piece and thus permits a common mounting in the motor vehicle, for example on a cross member 6.

Steering shaft 1 has an eversible tube 7, 7' between two sections of the steering shaft that joins these sections. The tube is eversible into eversible tube cavity 8 at end 9 which is shown on the right in the drawings. When axial pressure is exerted on steering wheel 2, the eversible tube wall undergoes continuous deformation with plastic deformation and with energy consumption. The incipient eversion of the eversible tube is indicated by the dot-dashed lines. The middle bearing point 3b serves to support steering shaft 1 displaceably near eversion end 9 and to prevent it from kinking. Eversible tube 7, 7' can absorb impact energy applied axially during a vehicle collision due to its ability to deform and can thus reduce the resistance of the steering wheel to the passenger and the load on said passenger.

Eversible tube 7, 7' reacts accordingly to the force of the impact of the passenger on steering wheel 2, since it has along its length areas with different resistances to deformation in order to produce varying levels of deformability of eversible tube 7, 7'.

Figure 2:
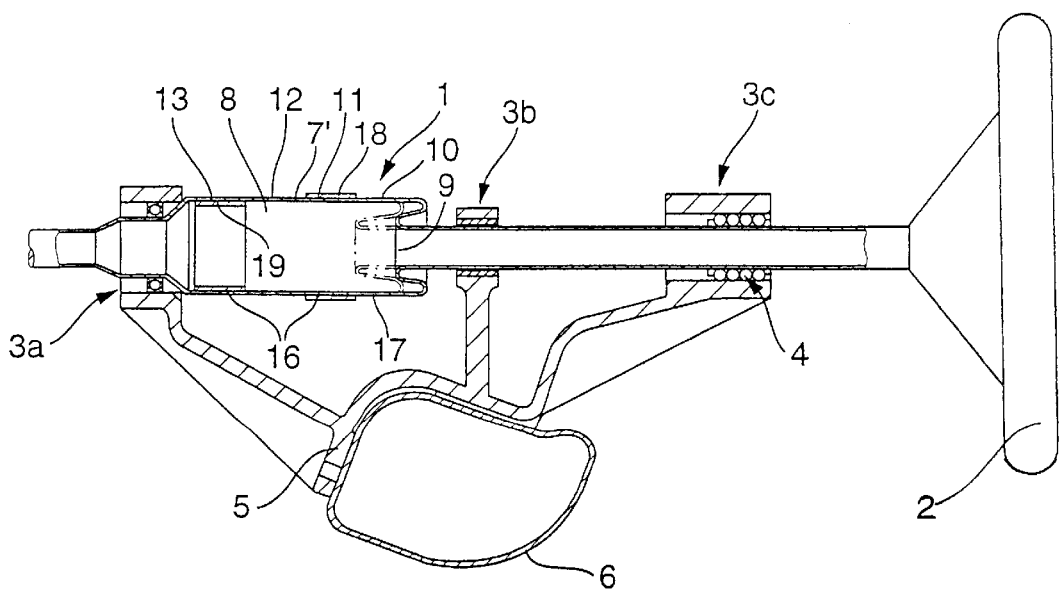
FIG. 2 is a steering shaft with an eversible tube according to a preferred embodiment of the present invention, with sections of different wall thickness.

As can be seen in the graph of force "F" as a function of travel along deformation path (s) in FIG. 2, eversible tube 7, 7' is so designed that beginning at eversion end 9, it has a first longitudinal section 10, and a second longitudinal section 11 adjacent thereto with a greater resistance to of deformability than the first longitudinal section 10. Eversible tube 7, 7' in the first longitudinal section 10 can be everted with a lower force F and in the second longitudinal section 11 with a higher force F. The resistance to deformation of eversible tube 7, 7' is selected so that the impact of a lighter passenger is fully absorbed with a greater degree of flexibility when longitudinal section 10 is everted, while the impact of an occupant who exerts a greater force is further absorbed in the area of greater resistance when longitudinal section 11 is everted, whereupon further energy conversion can take place.

This longitudinal section 11 with the higher resistance to deformation is in turn abutted by a longitudinal section 12 with easier deformability, so that the load imposed by the passenger is again accepted, which thus limits a longitudinal section 13 with the highest resistance to deformation in the possible end phase of eversion in order to avoid if possible a complete eversion of eversible tube 7, 7' and an impact of steering shaft 2 with the end stop.

The embodiment in FIG. 1 shows an eversible tube 7 whose longitudinal sections 10, 11, 12 and 13 have different inside diameters, while the wall thickness 14 is approximately the same throughout. Thus, longitudinal section 10 is made with an inside diameter that is larger than that of longitudinal section 11 and is easier to evert as a result. Longitudinal section 11 is intended to offer higher resistance with greater energy conversion to those passengers who impact with greater force, and by whom longitudinal section 10 has already been everted. Longitudinal section 12 on the other hand has a larger inside diameter, and adjacent longitudinal section 13 has the narrowest inside diameter of eversible tube 7 and the greatest resistance to deformation in the final eversion phase. By providing different diameter sections, the deformation behavior of the eversible tube can be selectively varied in each longitudinal section. Although the wall thickness 14 is shown to be approximately the same in each section, the wall thickness may be varied in order to further selectively vary the deformation characteristics of the eversible tube 7.

The cylindrical shape of these longitudinal sections 10, 11, 12, 13 in each longitudinal section offers an approximately constant deformation force or constant resistance of steering shaft 1 to the passengers imposing the force. The longitudinal sections 10, 11, 12 and 13 are linked by conical sections 15 that result in a uniform transition between different diameter sections, e.g., from a low resistance to deformation to a high resistance to deformation, between section 10 and section 11, and from a high deformation resistance to a low deformation resistance between section 11 and section 12.

In FIG. 2, another possible design is provided by eversible tube 7' which is designed with a variable wall thickness that determines the resistance to deformation. On or in a steering shaft 17, bushings 18, 19 are mounted or inserted, by which the resistance to deformation of the eversible tube is increased as indicated in the description of FIG. 1. Beyond longitudinal section 10, beginning at eversion end 9, whose resistance to eversion is designed for a lighter passenger, bushing 18 mounted externally on steering shaft 17 increases the resistance to eversion in longitudinal section 11 to a degree that is necessary to achieve a higher energy conversion of the forces that are initiated by the impact process on steering wheel 2 from an individual who impacts with greater force. Then, beyond this bushing 18, the resistance to eversion is correspondingly reduced through longitudinal section 12, and then increased sharply once more by bushing 19 inserted in the final phase of eversion in longitudinal section 13. A variable wall thickness 16 of course can also be provided by other conventional methods.

The flexibility of steering shaft 1 under the influence of forces acting axially can thus be simply adapted to the conditions in any motor vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An eversible tube for a steering shaft of a motor vehicle, said tube being eversible to absorb energy of an axial force applied thereto by plastic deformation, said tube comprising at least two longitudinal sections which are Plastically deformable by respectively different values of said axial force, wherein the tube is part of a steering shaft supported in a three-point bearing with three axially spaced bearing points, a central of said bearings locating the steering shaft displaceably near an end of the tube, and wherein a ball cage that is displaceable with the steering shaft is located at at least one bearing point.

2. An eversible tube according to claim 1, wherein the bearing points are combined in one piece in a mounting flange and located commonly in the motor vehicle.

3. An eversible tube according to claim 1, wherein a first of said sections at an end of the tube from which the axial force is applied is plastically deformable by a relatively lower value of said axial force than a second of said sections adjacent said first section on a side opposite said end of the tube.

4. An eversible tube according to claim 3, wherein the first longitudinal section, has a smaller wall thickness than the second longitudinal section.

5. An eversible tube according to claim 3, wherein a third of said sections abuts the second section on a side opposite said end of the tube, said third section being plastically deformable by a relatively lower value of said axial force than said second section.

6. An eversible tube according to claim 3, wherein eversible tube has one of said sections located at an end of the tube opposite said end from which the axial force is applied is plastically deformable by a relatively highest value of said axial force as compared to other of said sections.

7. A steering shaft assembly for a motor vehicle, comprising:
a steering shaft having a first longitudinal end to be coupled to a steering wheel and having a second longitudinal end,
said steering shaft having an eversible tube including a plurality of longitudinal sections disposed sequentially between said first longitudinal end and said second longitudinal end, said longitudinal sections being plastically deformable to absorb energy of an axial force applied to the steering shaft,
a first of said longitudinal sections located nearest said first longitudinal end being configured to plastically deform at a lower value of said axial force than a second of said longitudinal sections located adjacent to said first longitudinal section toward said second longitudinal end, and
said longitudinal sections being configured to plastically deform in sequential order starting with said first longitudinal section,
wherein said first longitudinal section has a larger inside diameter than said second longitudinal section.

8. A steering shaft assembly according to claim 7, wherein a wall thickness of the tube is approximately the same along a longitudinal length of the tube.

9. A steering shaft assembly according to claim 7, wherein said first and said second longitudinal sections are connected by a conical section.

10. A steering shaft assembly according to claim 7, wherein the first longitudinal section, has a smaller wall thickness than the second longitudinal section.

11. A steering shaft assembly according to claim 7, wherein an end of said first longitudinal section located toward the first longitudinal end of the steering shaft is configured in an everted manner prior to application of said axial force.

12. A steering shaft assembly according to claim 7, wherein said eversible tube further comprises a third and a fourth of said longitudinal sections located adjacent to said second longitudinal section toward said second longitudinal end, said third longitudinal section being configured to absorb less energy than said second longitudinal section, and said fourth longitudinal section being configured to absorb more energy than said third longitudinal section.

13. A steering shaft assembly according to claim 7, further comprising a three-point bearing for supporting said steering shaft, said three-point bearing including a first bearing located toward said first longitudinal end, a second bearing located toward said second longitudinal end, and a third bearing located between said first and second bearings, said first and third bearings allowing axial movement of said steering shaft, said second bearing preventing axial movement of said steering shaft.

14. A steering shaft assembly according to claim 13, wherein said eversible tube is located between said second and third bearings.

15. A steering shaft assembly according to claim 13, wherein said first bearing includes a ball cage that is displaceable with the steering shaft.

16. A steering shaft assembly according to claim 13, wherein first, second, and third bearings are combined in one piece in a mounting flange and located commonly in the motor vehicle.

* * * * *